United States Patent [19]

Erdley

[11] 4,082,005

[45] Apr. 4, 1978

[54] SPIN COUPLED, ANGULAR RATE SENSITIVE INERTIAL SENSORS WITH MOUNTING STRUCTURE AND METHOD OF FABRICATING AND MOUNTING SAME

[75] Inventor: Harold F. Erdley, Los Angeles, Calif.

[73] Assignee: Teledyne Industries, Inc., Los Angeles, Calif.

[21] Appl. No.: 710,693

[22] Filed: Feb. 8, 1976

Related U.S. Application Data

[63] Continuation-in-part of Ser. No. 608,770, Aug. 25, 1975, Pat. No. 3,974,701.

[51] Int. Cl.² .................... G01C 19/22; G01C 19/42
[52] U.S. Cl. .......................................... 73/505; 74/5 F
[58] Field of Search ................. 73/504, 505, 516 R, 73/517 R; 74/5 R, 5 F

[56] References Cited

U.S. PATENT DOCUMENTS

| | | | |
|---|---|---|---|
| 3,477,298 | 11/1969 | Howe | 74/5.34 |
| 3,540,289 | 11/1970 | Ivers | 73/505 |
| 3,832,906 | 9/1974 | Craig | 74/5 F |

*Primary Examiner*—James J. Gill
*Attorney, Agent, or Firm*—Blakely, Sokoloff, Taylor & Zafman

[57] ABSTRACT

Spin coupled angular rate sensitive inertial sensors of the tuned suspension system type with mounting structure, and method of fabricating and mounting such sensors whereby the twice spin frequency linear and angular vibration sensitivity characteristic of tuned sensors may be eliminated. The twice spin frequency angular vibration sensitivity characteristic of other tuned inertial sensors is reduced by creating an equal and opposite torque component dependent on the same vibrational input by angularly offsetting the rotor suspension system from a plane orthogonal to the spin axis, and by providing the shaft assembly with an effective product of inertia of controlled magnitude and orientation.

Compensation for twice spin frequency linear vibration caused primarily by the spin bearings is achieved either by mounting the spin bearings in a relatively soft mounting, or supporting the instrument case (non-rotating portion) on a suspension tuned to twice spin frequency in the translational mode. Further reduction of twice spin frequency angular vibration sensitivity may also be accomplished by the relatively soft mounting of the spin bearings and/or the support of the instrument case on a suspension system tuned to twice spin frequency angular vibration. Various forms of implementation of the invention and methods of dynamic rebalancing the rotating assemblies are disclosed.

33 Claims, 16 Drawing Figures

SPIN COUPLED, ANGULAR RATE SENSITIVE INERTIAL SENSORS WITH MOUNTING STRUCTURE AND METHOD OF FABRICATING AND MOUNTING SAME

This application is a continuation-in-part application of my co-pending application entitled "Spin Coupled, Angular Rate Sensitive Inertial Sensors With Optional Acceleration Sensing Capability And Method Of Fabricating Same", filed Aug. 25, 1975 as Ser. No. 608,770, now U.S. Pat. No. 3,974,701, dated Aug. 17, 1976.

BACKGROUND OF THE INVENTION

1. Field of the Invention

The present invention relates to precision inertial instruments, and more particularly to rotating, mechanically tuned gyroscope and/or accelerometer devices.

2. Prior Art

The present invention comprises apparatus and techniques for substantially eliminating a major source of disturbance and errors in a certain class of inertial sensors by making certain changes and additions to the structure thereof. This allows the practical implementation of inertial grade sensors for producing two axis angular rate information and two axis acceleration information utilizing a single sensitive element. The invention may also be utilized in various prior art instruments to subdue one of the most troublesome sources of error in such instruments; twice spin frequency vibration induced torques.

The prior art patents describing certain types of prior art instruments and apparatus of the general type or class to which the present invention pertains includes U.S. Pat. No. 3,678,764 to H. F. Erdley, et al; U.S. Pat. No. 3,354,726 to W. J. Krupick, et al; U.S. Pat. No. 3,301,073 and U.S. Pat. No. 3,702,568 to E. W. Howe; U.S. Pat. No. 3,832,906 to R. J. G. Craig; U.S. Pat. No. 3,543,301 to D. Barnett; and U.S. Pat. No. 3,700,290 to W. B. Ensinger. Pertinent publications include the article entitled "Dynamically Tuned Free Rotor Gyroscope" published in Control Engineering of June, 1964 pages 67–72 (A. W. Howe) and AIAA Paper No. 65–435 delivered at the AIAA meeting in San Francisco, Calif., July 26–29, 1965, the paper entitled "Dynamics of Ideal Suspensions Applied to Rotating Bodies in Space".

As the foregoing prior art discloses, various mechanizations of rotating, mechanically tuned suspension systems have been successfully employed as the fundamental supporting means for precision inertial instruments, principally gyroscopic rotors having two degrees of freedom. These suspension systems are generally made up of one or more tuned gimbal-torsion spring support combinations, which ideally result in a zero value for one of the two dynamic natural frequencies of the rotating system, and a value of slightly lower than twice the rotation frequency for the other natural frequency, the nutation frequency.

Since the desired response of this type of inertial sensor is centered at zero frequency, any nutation frequency motions are not only of no value, but may cause distortion, rectification, and other errors in the low frequency output measurements if not suitably damped. This damping is generally carried out by a combination of mechanical and control system (instrument capture loop or gimbal servo) design methods.

While this type of mechanization of inertial sensor has proven to be useful for a wide variety of applications, certain fundamental performance limitations exist. These include the common inertial sensor sensitivities to acceleration induced error torques (in association with mass unbalance and anisoelasticity conditions) and other low frequency error torques, such as magnetic and windage induced torques, as well as a class of error torques which is primarily associated with tuned suspension system sensors, namely the twice spin frequency rectifications of both angular and translational input motions. This class of error torques is generally of sufficient magnitude to necessitate both the employment of more than one gimbal and associated torsion spring suspension element per instrument and the associated careful balancing and adjustment methods required to insure effective cancellation of the effects.

Because all of the above mechanizations of inertial sensors are limited to two axes of information (centered about zero frequency) a total of two such sensors are required to provide all three axes of angular rate information. In addition, either two or three separate accelerometers are required for most inertial system requirements. Alternatively, three, two-axis gyro sensors, at least two of which are pendulous (built with a specific mass unbalance along the rotation axis) are required to supply sufficient information from which can be derived all three axes of angular rate and linear acceleration.

Another mechanization of the mechanically tuned suspension system exists in which the two natural frequencies of the instrument are adjusted to slightly greater than zero and (ideally) to precisely twice the rotation frequency. By a proper selection of the mechanical parameters of the instrument, including unequal moments of inertia of the rotor about the two principal axes orthogonal to the rotation axis, the response of the instrument centered at twice the rotation frequency is ideally a function of low frequency angular rate inputs only and is not a function of the usually troublesome low frequency torques. However, such a mechanization is sensitive to twice spin frequency angular rate and linear vibrational input rectification. This sensitivity has been the fundamental limitation to the practical exploitation of this gyro concept, in as much as the means for cancellation of these effects which are used for the more conventional mechanization, described previously, do not apply here.

BRIEF SUMMARY OF THE INVENTION

Spin coupled angular rate sensitive inertial sensors of the tuned suspension system type, and method of fabricating and mounting such sensors whereby the twice spin frequency linear and angular vibration sensitivity characteristic of tuned sensors may be eliminated. The elimination of this sensitivity allows the implementation of such devices so as to generate useful signals at the twice spin frequency, as measured with respect to a case fixed coordinate system. By making the rotor pendulous and by utilizing the signals centered around both zero frequency and twice spin frequency, sensors for providing two axis angular rate information and two axis acceleration information may be fabricated.

The twice spin frequency angular vibration sensitivity characteristic of other tuned inertial sensors is reduced by creating an equal and opposite torque component dependent on the same vibrational input. This is done by angularly offsetting the rotor suspension system from a plane orthogonal to the spin axis, and by providing the shaft assembly with an effective product of inertia of controlled magnitude and orientation. The product of inertia modulates may twice spin frequency angular vibration of the shaft about an axis orthogonal to the spin axis with the spin frequency of the shaft to provide an angular disturbance of the shaft about the spin axis. This angular disturbance in combination with the inclination of the rotor suspension system causes the compensating twice spin frequency torque component on the rotor, which may be controlled as appropriate by adjusting the magnitude and position of the product of inertia on the shaft. The dynamic balance of the shaft may be maintained in spite of the presence of the product of inertia by coupling an equal and opposite product of inertia to the shaft so as to allow spring restrained angular rotation thereof about the spin axis. This balancing inertia may also be used to absorb spin speed angular disturbances of the shaft caused by other sources by tuning the balancing inertia-torsion spring combination to a natural frequency equal to the spin speed.

Compensation for twice spin frequency linear vibration caused primarily by the spin bearings is achieved either by mounting the spin bearings in a relatively soft mounting, or supporting the instrument case (non-rotation portion) on a suspension tuned to twice spin frequency in the translational mode. Further reduction of twice spin frequency angular vibration sensitivity may also be accomplished by the relatively soft mounting of the spin bearings and/or the support of the instrument case on a suspension system tuned to twice spin frequency angular vibration. Various forms of implementation of the invention and methods of dynamic rebalancing the rotation assemblies are disclosed.

DETAILED DESCRIPTION OF THE INVENTION

The present invention, together with the concepts of spin-coupling disclosed in my co-pending application, makes possible the effective elimination of the sensitivity of mechanically tuned sensor mechanizations to twice spin frequency inputs. Because the present invention depends in part upon an understanding of the concepts of spin coupling, much of the disclosure of the co-pending application is substantially repeated herein. However, while the following description includes the concept of providing a radial mass on balance of the rigid body assembly associated with the shaft, it will subsequently be noted that such radial mass on balance is not utilized with respect to the preferred embodiment of the invention.

The spin coupling technique basically employs a nonorthogonal suspension coupling of the rotor to the shaft in combination with a specific effective product of inertia (and radial mass unbalance, if desired) of the rigid body assembly associated with the shaft. The product of inertia and radial mass unbalance couple rate and translational motion, respectively, of the shaft about axes normal to the shaft, to the shaft axis. The non-orthogonal suspension, in turn, couples the motion about the shaft axis to the rotor about axes perpendicular to the shaft axis. Thus, by this combination, additional components of sensitivity of the sensor rotor to twice spin frequency angular rate and translational motion inputs can be produced, respectively, which can effectively cancel the inherent instrument sensitivities to these effects. These additional sensitivities are easily adjustable by adjusting balance weights on the rotating shaft assembly, and are non-critical and stable.

The product of inertia and mass unbalance of the rigid body shaft assembly previously mentioned constitute a potential dynamic unbalance of the entire rotating system. In order to maintain the dynamic unbalance experienced by the spin bearings at null and retain the desired effect, an auxiliary inertia-spring element is coupled to this rotating rigid body in such a way as to have a product of inertia (and unbalance) with respect to the spin axis which is the negative of the product of inertia and unbalance which represents the dynamic unbalance of the rotating rigid body.

In order to prevent direct disturbances of the shaft about the spin axis from such sources as spin bearing noise or drive motor disturbances from similarly coupling into the rotor, the spring element may be selected to yield a resonant frequency about the spin axis of the inertia-spring combination equal to the spin speed to provide inertial damping of these disturbances.

The ability of the present invention to minimize twice spin frequency disturbances of the rotor allows the use of the twice spin frequency motion of the rotor to derive useful signal outputs. Thus, in the preferred embodiment of the present invention, an inertial sensor employing one of the basic mechanizations previously mentioned is utilized. This basic mechanization employs a nonsymmetric rotor, with one of the natural frequencies being twice the spin frequency and the other natural frequency being located slightly above zero frequency. The response of this type of sensor centered about zero frequency is directly related to the angular rates about the two input axes. In addition, this response is also sensitive to mass unbalance torques, anisoelasticity related torques and other low frequency error torques (such as magnetic and windage torques), as well as twice spin frequency angular rate and linear vibrational input rectification torques. The response of this type of sensor centered at twice spin frequency is again directly related to the angular rates about the two input axes. It is also dependent upon twice spin frequency linear and angular vibrational inputs, and is further dependent on any twice spin frequency components in the so called low frequency error torques, which are normally very low. In the preferred embodiment, it is the control of the twice spin frequency response to the twice spin frequency vibrational inputs (linear and angular) to which the present invention is applied.

By making use of the inherent high torquing rate capability of typical strapdown type sensor designs, it is possible to build into such a sensor a sufficiently high spin axis pendulosity such that, for all practical purposes, the instrument is sensitive only to the sum of angular rate inputs and linear acceleration inputs. Since the angular rate inputs are measured separately in the twice spin frequency band output, it is possible to subtract these angular rate measurements from this sum in order to obtain the acceleration measurements as separate measurements.

In the preferred embodiment of the present invention, the tuned rotary suspension includes an arrangement which has specific spring rates about two orthogonal axes, the plane defined by these axes being oriented at a relatively small but specific angle away from the plane which is normal to the spin axis. The inertia supported by these springs is designed to have unequal moments of inertia about two orthogonal axes normal to the spin axis. There are two general design approaches here. The first approach is to use a nearly symmetrical spring support coupled directly to the nonsymmetric inertia; the second approach is to use an intermediate gimbal and specific spring constants for the two flexure support axes. The latter approach would appear to have certain advantages in terms of tuning flexibility and translational stiffness, and therefore is utilized in the preferred embodiment.

The overall system is designed so that the resonant frequency determined principally by the nonsymmetric inertia and the support spring rate is coincident with twice the spin frequency, as previously mentioned, with the second resonant frequency being set as low as possible to maximize the zero frequency deflection for zero frequency torques (e.g., to best approach a "free rotor" condition).

In this manner the sensor can be made to respond only to angular rates at the twice spin speed resonance, and will respond to the sum of angular rates, error torques, and acceleration induced torques at low frequencies. The angular offset of the suspension system and the effective product of inertia of the spinning rigid body to which the suspension is attached is adjusted to ideally provide a twice spin speed torque insensitivity to twice spin frequency angular motions induced principally by the spin bearings.

In the description to follow the structure and parameters of the foregoing embodiment are first described in detail; thereafter exemplary additional embodiments are also described as an illustration of the general concepts and applications of the invention. It is to be understood, however, that all of these specific embodiments are by way of example only, as the principles are generally applicable to any rotating tuned sensor configuration which may encounter objectional twice spin frequency sensitivities.

Figure 1:
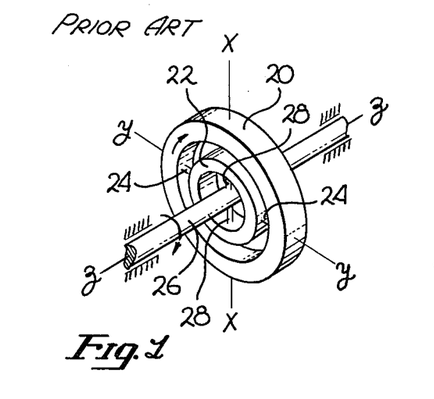
FIG. 1 is a perspective representation of a specific form of prior art tuned rotor suspension system.

First referring to FIG. 1, a perspective illustration of one prior art rotor suspension system may be seen. This system is that of E. W. Howe, described in detail in his prior patents and publications hereinbefore identified. The system is comprised of a rotor 20 supported from a gimbal 22 by a pair of torsion spring members 24 so as to allow relative spring restrained rotation between the rotor 20 and the gimbal 22 along the $y$ axis. The gimbal 22 in turn is supported on a shaft 26 by a pair of torsion springs 28 so as to allow relative spring restrained angular rotation therebetween along the $x$ axis. (The $x$ and $y$ axes represent a rotor fixed rotating coordinate system.) By the proper selection of the torsion bar spring rates and suitable adjustment of the inertias of the gimbal, the dynamics of the system will cancel the spring rate of the suspension system, so that the rotor will behave as a free rotor. The problem with this type of instrument however, is that the suspension system is sensitive to twice spin frequency angular vibrations having components about any case fixed axis orthogonal to the spin axis. These sensitivities, coupled with the normally experienced twice spin frequency angular vibration of the shaft caused by the spin bearings (and the variations thereof caused by environmental effects, etc.) prevent the direct application of this configuration to navigational grade instruments.

Figure 2:
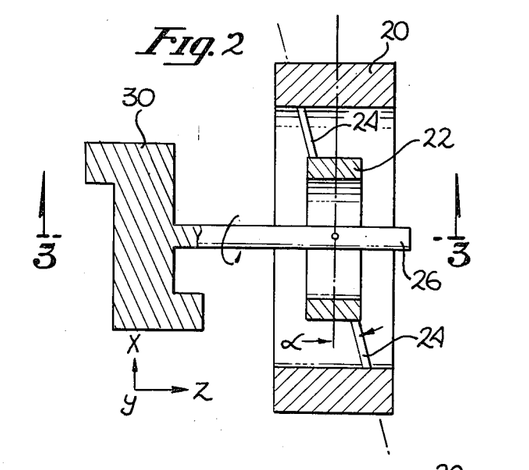
FIG. 2 is a cross-sectional representation of a suspension system similar to FIG. 1 incorporating the present invention.
Figure 3:
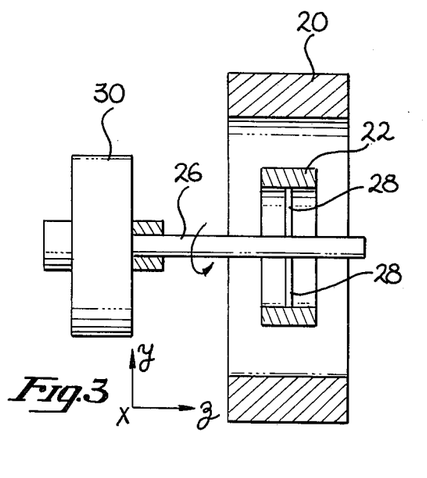
FIG. 3 is a cross-sectional representation of the system of FIG. 2 taken along line 3—3 thereof.

Now referring to FIGS. 2 and 3, schematic cross-sections of an instrument of the general type shown in FIG. 1, but incorporating aspects of the present invention, may be seen. Utilizing the general coordinate system of FIG. 1, FIG. 2 will represent a cross-section in the $x\,z$ plane. As before, the gimbal 22 is supported on the shaft by a pair of inner torsion springs 28, with the rotor being supported from the gimbal 22 by a pair of outer torsion springs 24, generally orthogonal to the inner springs 28. However, it will be noted that the axis of the outer torsion springs 24 is angularly offset in the $y\,z$ plane by an angle alpha ($\alpha$) from the $y$ axis of the rotor. It will be noted also that a member 30 having a substantial product of inertia with respect to the $y\,z$ axes is directly coupled to the shaft 26.

By selecting the magnitude of the product of inertia, hereinafter referred to as $D_S$, in conjunction with the angle $\alpha$, the inherent twice spin frequency angular vibration sensitivity of the prior art configuration of FIG. 1 may be effectively cancelled. In particular, the twice spin frequency angular vibration of the shaft about any axis orthogonal to the spin axis is modulated by the product of inertia coupled to the spin axis (and rotating at spin speed) to provide an angular vibration of the shaft about the spin axis (superimposed on the constant spin speed component of the shaft assembly). This spin frequency angular disturbance of the shaft in combination with the nonorthogonal coupling of the shaft to the rotor (e.g., as a result of the offset angle $\alpha$) couples a torque component to the rotor not only about the spin axis, but also about the rotor fixed $y$ axis. In terms of a case fixed coordinate system, this component of torque on the rotor may be represented by the sum of a zero frequency torque and a twice spin frequency torque. Since the magnitude and case fixed orientation of these torques for a given twice spin frequency angular vibration input will depend upon not only the angle alpha ($\alpha$) and the magnitude of the product of inertia, but also on the angular orientation of the product of inertia with respect to the inclined suspension axis, one can control both the twice spin frequency angular vibration induced zero frequency torque on the rotor, and the twice spin frequency angular vibration induced twice spin frequency torque on the rotor (but not both torques independently). It should be noted here, that while the specific configuration shown in FIGS. 2 and 3 creates an undesired dynamic unbalance to the rotating assembly, a technique for eliminating this dynamic unbalance while still retaining the same effective result is later described in detail herein.

The ability to control twice spin frequency angular vibration induced torques on the rotor may be utilized in a number of ways. The most obvious application of this technique is with respect to the general class of instruments utilizing a suspension system similar to that of FIG. 1. By a proper selection and adjustment of the parameters, the inherent twice spin frequency angular vibration sensitivity of the tuned free rotor of E. W. Howe may be eliminated in a simple and straight forward way. Accordingly, the more complicated suspension systems such as those of U.S. Pat. Nos. 3,678,764 and 3,832,906, and particularly the additional adjustments required on the tuned suspension system thereof, are not required when utilizing the present invention.

Since the present invention can be used to control the twice spin frequency torques on the rotor caused by twice spin frequency angular vibration of the shaft, the twice spin frequency response of the rotor may be utilized to derive useful output signals. In particular, in the preferred embodiment, the parameters are selected and adjustments made so that the twice spin frequency torque required to maintain the twice spin frequency vibration of the rotor at a null is used as a measure of the angular rate input to the instrument. Of course, two axis angular information may be derived in this manner.

To maximize the twice spin frequency response of the rotor to a twice spin frequency torque on the rotor, one of the rotor natural frequencies is adjusted to be equal to twice spin speed. This places the second natural frequency of the rotor at some value above zero frequency, dependent upon the rotor and gimbal configurations. To tune the rotor to twice spin frequency, the following tuning condition must be met:

$$\frac{K_i + K_o}{9} = n^2 \left[ 2(A + B - C) + \frac{1}{2}(A_1 + B_1 - C_1) + \frac{C(C_1 + C_s)\tan^2\alpha}{2(C + C_1 + C_s)} \right]$$

where
  $K_i$: is the torsional spring rate of the inner torsion springs coupling the gimbal to the shaft,
  $K_o$: is the torsional spring rate of the outer torsion springs coupling the gimbal to the rotor,
  $n$: is the spin frequency;
  $A, B, C$: are the principal moments of inertia of the rotor about the $x$, $y$ and $z$ axes respectively,
  $A_1, B_1, C_1$: are the principal moments of inertia of the gimbal about the $x$, $y$ and $z$ axes respectively,
  $C_s$: is the polar moment of inertia of the shaft (not including the rotor assembly), and
  $\alpha$: is the angle of inclination of the rotor suspension as shown in FIG. 2.

For an instrument adjusted in accordance with the foregoing equation, the twice spin speed angular vibration sensitivity of the twice spin speed response of the instrument is eliminated if the following condition is met:

$$\frac{D_s C \tan\alpha}{C + C_1 + C_s} = A + B - C + \frac{A_1 + B_1 - C_1}{2}$$

where the parameters are as previously defined, and
  $D_s$: is the effective product of inertia of the shaft about the $y\,z$ axes.

By satisfying the foregoing equation, any twice spin frequency angular vibration of the shaft about axes orthogonal to the spin axis will not result in any twice spin frequency torques on the rotor. Of course, since the twice spin frequency torque on the rotor caused by a constant (zero frequency) angular rate input to the instrument is proportional to the angular rate input times the spin speed times the difference in the inertias A and B; the difference in the moments of inertia of the rotor about the $x$ and $y$ axes should be maximized.

In a closed loop system, any disturbance of the rotor sensed by the pickoffs will be nulled by equal and opposite torques of the rotor applied by the torquers. Thus, regardless of the response of the rotor, a low frequency torque input to the rotor can only be balanced by a corresponding low frequency torque input. However, for pickoff signal separation purposes, it is desirable to have the open loop response of the rotor at twice spin frequency be independent of the DC and low frequency torques. This may be achieved if the following condition is met:

$$\frac{n^2}{2}\left[ A_1 + B_1 - C_1 - \frac{C(C_1 + C_s)\tan^2\alpha}{C + C_1 + C_s} \right] + \frac{K_o - i}{2} = 0$$

Thus, if the foregoing three equations are met and the magnitude of A-B is maximized, the twice spin frequency response of the rotor to constant and low frequency rate inputs is maximized, and the twice spin frequency response of the rotor to zero frequency torques such as windage, pendulosity, etc. and to twice spin frequency angular vibration is eliminated. Accordingly, highly accurate angular rate sensing may be readily achieved.

Though the instrument just described is not tuned to zero frequency (e.g., not tuned as a free rotor instrument) the effective spring restraint of the rotor is not high, so that by making the rotor pendulous by an amount which is substantially larger than the expected constant error torques such as windage, etc. the zero frequency (and low frequency) torque required to capture the rotor may be utilized as a measure of the acceleration being experienced by the instrument. The existence of such a pendulosity however, would make the instrument of FIGS. 2 and 3 sensitive to twice spin frequency linear vibration components along axes perpendicular to the spin axis. According to my earlier application this sensitivity may be eliminated by a technique very similar to that hereinbefore described with respect to twin spin frequency angular vibrations. In particular, by appropriately radially unbalancing the shaft assembly about the spin axis, a twice spin frequency linear vibration will cause a corresponding angular vibration of the shaft about the spin axis, which in turn will cause a zero frequency and a twice spin frequency torque on the rotor, as before. Adjustment of the magnitude and location of the radial unbalance with respect to the inclination of the support system allows control either of the zero frequency or the twice spin frequency torque as desired (but again, not both independently). By way of example, the location and the magnitude of the radial unbalance is adjusted so as to minimize the twice spin frequency torque on the rotor. Accordingly, if the following condition is met, the twice spin frequency linear vibration sensitivity of the twice spin frequency response of the rotor will be eliminated.

$$P = MR \tan \alpha/2$$

where

P: is the pendulosity of the rotor

MR: is the effective first moment or radial unbalance of the rotating shaft assembly.

Figure 4:
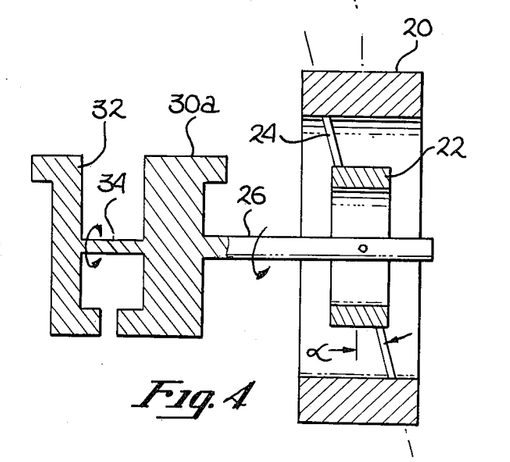
FIG. 4 is a cross-sectional representation of an alternate embodiment utilizing a balancing inertia coupled to the rotating shaft assembly through a torsional spring restraint.

Now referring to FIG. 4, the method of maintaining the dynamic balance of the rotating assembly will be described. This figure is similar to FIG. 2, but includes a balancing inertia 32 coupled to the shaft assembly through a torsion spring 34, thereby allowing relative rotation therebetween. If the balancing inertia 32 has a product of inertia which is equal and opposite to the product of inertia of member 30a (representing the product of inertia of the rotating assembly rigidly coupled to the shaft) the rotating assembly will be dynamically balanced. However, the effect of the product of inertia on the shaft assembly will still be retained if the spring rate of the torsion spring 34 is relatively low, as the response of the balance inertia 32 to twice spin frequency angular vibration input will not be significantly coupled to the shaft assembly.

It should be noted that any spin speed disturbance of the shaft about the spin axis will be coupled to the rotor by way of zero frequency and twice spin frequency torques, so that unless special provisions are made, such disturbances caused by the spin bearings, motor and other sources will result in large and relatively erratic disturbing torques on the rotor. However, if the combination of the torsional spring rate of torsion spring 34 and the moment of inertia of the balancing inertia 32 about the spin axis are chosen so as to have a natural frequency equal to the spin frequency, the balancing inertia 32 will act as a vibration absorber with respect to any spin frequency disturbances of the shaft about the spin axis. While the balancing inertia 32 will also absorb the compensating torques on the shaft caused by the product of inertia of member 30a coupled directly to the shaft, the spin speed torques of the balancing inertia 32 caused by its product of inertia will be coupled directly to the shaft through the torsion spring 34. Accordingly, when using the balancing inertia 32 as shown in FIG. 4, the effective product of inertia coupled to the shaft assembly is the product of inertia of the balancing inertia 32 rather than the product of inertia of member 30a.

Figures 5, 6:
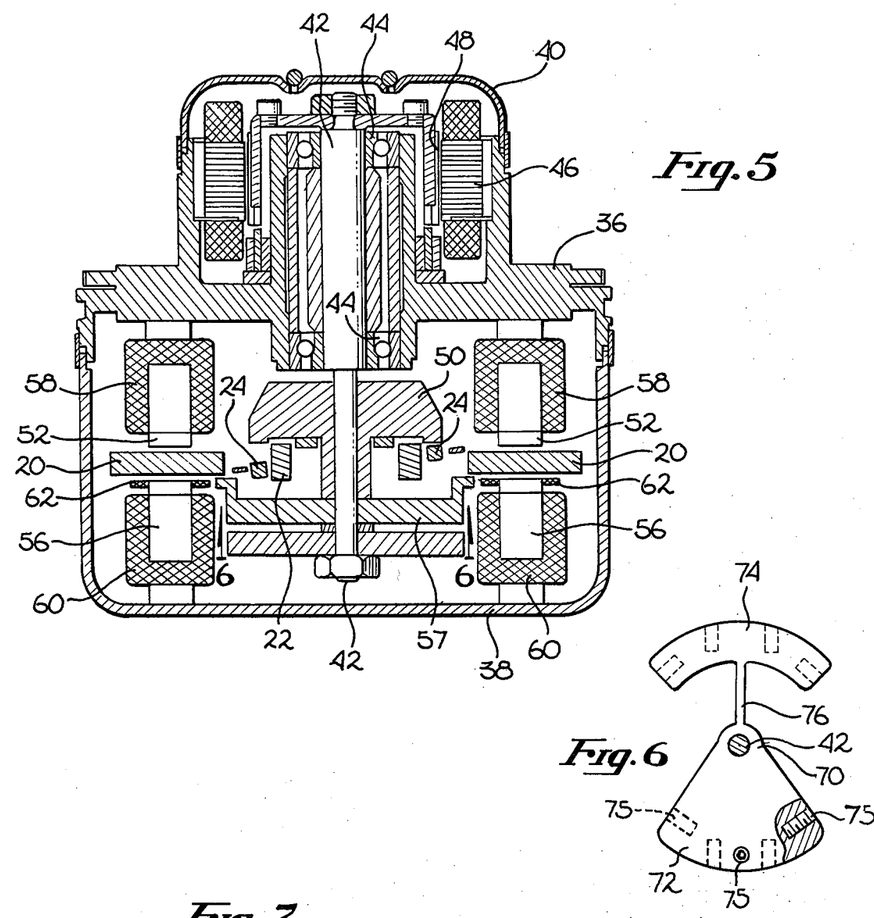
FIG. 5 is a cross-section of an instrument fabricated in accordance with the combination of FIG. 4.
FIG. 6 is an end-view of the balancing inertia on the instrument of FIG. 5, taken along line 6—6 of that figure.

Now referring to FIGS. 5 and 6, two views of a practical practical embodiment in accordance with the foregoing description may be seen. FIG. 5 is a cross-section of the complete instrument, and FIG. 6 is a view taken along line 6—6 of FIG. 5. The instrument is contained within a housing 36 and enclosed by top and bottom covers 38 and 40. The shaft 42 is supported on spin bearings 44 and driven in rotation by a conventional synchronous motor comprised of a stator 46 and a hysteresis rotor 48. A flexure pivot support member 50 supports a first pair of cross strap flexures coupled to the gimbal 22, with a second pair of flexures 24 coupling the gimbal to the rotor 20. (Reference is hereby made to U.S. Pat. No. 3,832,906 for further details of such cross strap flexure support of gimbals and rotors as is known in the prior art.) The rotor travel is limited by a stop 57 on the rotating assembly so that the rotor cannot deflect to strike the pickoff cores 52 and the torquer cores 56. Four pickoff assemblies, two on each of the axes, comprised of pickoff cores 52 and coils 58 are used. Similarly, two axis torquing is provided by four torquer cores 56 and drive coils 60 (two on each axis).

Because of the desired flat construction of the rotor 20, the simplicity of the design, and the need for a wide dynamic range torquing system, an electromagnetic torquer is employed operating at a fixed frequency. The cores and the rotor are all made up of ferro magnetic materials so that the magnetic flux return path for both the torquer and pickoff magnetic circuits is through the rotor 20. (The rotor is preferably uniform in geometry, with $|A-B|$ being maximized by alternate quadrants having lighter and heavier materials.)

A sensing coil 62 is used on each pole (two poles per torquer core) of each torquer core to obtain an accurate measure of the magnitude of the alternating magnetic flux in the air gap, independent of torquer core mechanical creep and rotor angular position. Since the magnitude of the torque is proportional to the square of the magnitude of the flux, the output voltage of the sensing coils 62 is sampled at a high frequency and converted to a digital measure similar to precision inertial analog to digital converter systems currently in use by the assignee of the present invention.

The torquing system employed here has certain important advantages over a permanent magnet type torquer. These include the elimination of a precision scaling resistor to convert from an electrical current to a voltage, an almost two orders of magnitude reduction in torquer scale factor temperature sensitivity, and the elimination of the need for scale switching in the output circuitry and analog to digital convertor. The pickoffs and torquers operate at widely different frequencies and are further isolated from one another by the shielding effect of the rotor.

A means for providing the effective radial unbalance on the shaft assembly as well as the effective product of inertia may be seen in FIG. 6. A member 70 is supported on shaft 42 adjacent the rotating stop 57. This member has a first rigid protrusion 72 extending radially from the shaft 42 and a second diametrically opposed element 74 coupled to the hub of member 70 by a relatively thin flat spring member 76. The member 72 provides both the radial unbalance and the product of inertia coupled directly to the shaft in accordance with the preceding description, with member 74 comprising the spring mounted counterbalancing product of inertia and counterblance mass to dynamically balance the shaft assembly. By proper selection of the coupling spring member 76, the desired tuning of the spring mounted member 74 to spin frequency may be achieved. (Adjusting screws allowing the adjustment of the product of inertia and the radial unbalance, as well as for dynamically balancing the system, are generally indicated by the numeral 75.)

Figure 7:
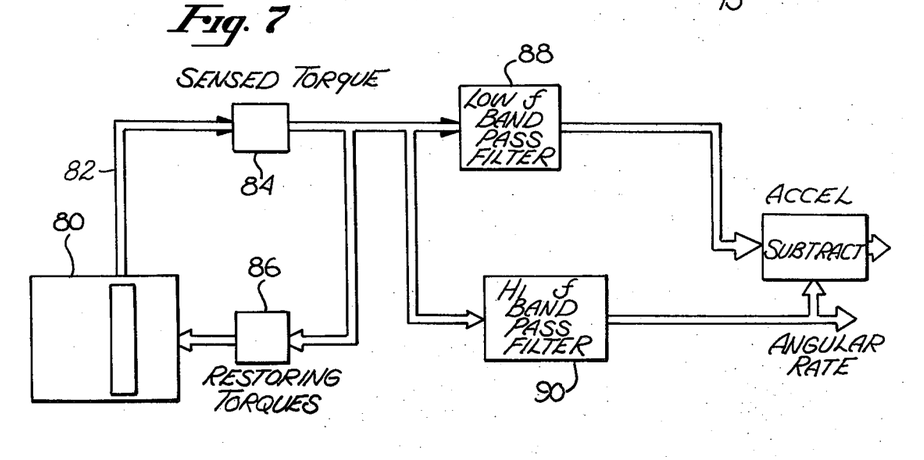
FIG. 7 is a block diagram of a signal processing and restoring torque system for the embodiment of FIG. 5.

A block diagram of the closed loop system may be seen in FIG. 7. The instrument, generally indicated by the numeral 89, provides relatively broad band two axis rotor angle output information on lines 82, which is conditioned by circuits 84 and 86 in a conventional manner for applying restoring torques to the torquers to maintain the rotor in a null position. (In the preferred embodiment the torquers are AC torquers operating at four times the spin frequency.) The output of the electronics 84 is also applied to low pass filters 88 and band pass filters 90. The output of the band pass filters 90, e.g., centered at a frequency equal to twice spin frequency, is a direct measure of the angular rates being applied to the instrument (two axis information being derived). The output of the low pass filter 88 is a combination of the angular rate and the acceleration, and accordingly the output of the band pass filter 90 may also be subtracted from the output of the low pass filter 88 to provide output signals proportional only to the accelerations being experienced by the instrument.

It will be noted that the rotor of the previously described system is supported with two axis angular freedom with respect to the shaft with only relatively low spring restraint on each axis. Accordingly, the rotor will tend to spin about a principal axis, and will tend to align itself with the spin axis of the shaft. Therefore the inclination of the suspension system by the angle $\alpha$ may be considered to be with respect to a plane orthogonal to the spin axis, or with respect to the plane containing two of the principal axes of the rotor. On the other hand, it is not a design restraint that the rotor be driven about a principal axis, and in general the desired effect of the inclination will be achieved if the inclination is referenced to either the plane orthogonal to the spin axis, or with respect to two of the principal axes of the rotor.

The general principles of the spin coupling are not limited only to tuned sensors of the type utilizing an intermediate gimbal. By way of specific example, the foregoing equations apply to a gimbal-less spring supported rotor by merely using a zero value for the gimbal inertias in the applicable equations. Thus the foregoing three principal equations for such a configuration reduce to the following:

$$\frac{K_i + K_o}{2} = n^2 \left[ 2(A+B-C) + \frac{CC_s \tan^2\alpha}{2(C+C_s)} \right]$$

$$A+B-C = \frac{D_s C \tan\alpha}{C+C_s}$$

$$K_o - K_i = \frac{n^2 CC_s \tan^2\alpha}{C+C_s}$$

Figure 8:
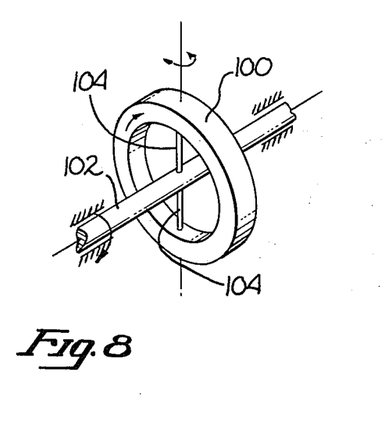
FIG. 8 is a perspective schematic representation of another prior art suspension system.
Figure 9:
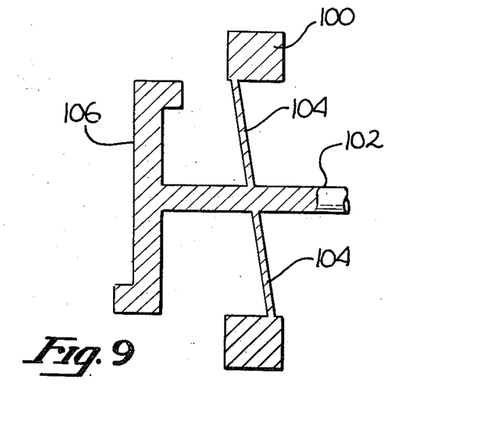
FIG. 9 is a schematic cross-section illustrating an instrument implementation utilizing the basic suspension system of FIG. 8.

Further, the principles of the spin coupling are not limited merely to tuned sensors wherein the rotor is provided with two degrees of freedom with respect to the shaft. By way of specific example, a prior art sensor utilizing a single degree of freedom of the rotor with respect to the shaft is shown in FIG. 8. This type of sensor utilizes a rotor 100 supported on a shaft assembly 102 by a torsion bar 104 so as to be torsion spring restrained about a single rotor fixed axis with respect to the shaft. Such a sensor as is known in the prior art is adjusted so that the single resonant frequency is equal to twice spin frequency, so that angular rate inputs disturb the rotor at its natural frequency. In theory such a sensor avoids disturbances caused by the common zero frequency error torques, but in practice is plagued by a high sensitivity to twice spin frequency angular vibration of the shaft. However, by inclining the torsion bar 104 as shown in FIG. 9 and also providing a product of inertia 106 on the rotating shaft assembly, the sensitivity to twice spin frequency angular vibration of the shaft may be eliminated and extremely accurate two axis angular rate measurements may be obtained.

The concepts of spin coupling have been verified experimentally in a single gimbal suspension device utilizing an angle of inclination of the rotor suspension alpha ($\alpha$) equal to four degrees. Of course there is nothing critical with respect to this specific angle, though it is expected that most designs will utilize an angle ranging from a substantial fraction of one degree to approximately five degrees. It is to be understood, however, that substantially any angle, particularly larger angles, may readily be used as desired, depending upon the characteristics of the particular design.

Also, it should be noted that the phrase "torsion springs" (and equivalent terminology) is used herein to identify various forms of suspension means that may be utilized in a tuned sensor. It is to be understood that such terminology is used in the most general sense to identify a suspension means or coupling element having as its most predominant compliance a torsional spring-rate about the specifically identified axis (or axes). While perfect rigidity in other modes cannot be achieved, and for that matter may not be desired, typically compliances in other modes of rotation and translation are preferably minimal. (A gimbal-less tuned sensor having two rotor-fixed axes of angular freedom being the exception to this statement; e.g., having substantial compliance about all axes falling in the plane of the suspension system.) The suspension means elements of U.S. Pat. Nos. 3,678,764; 3,832,906; 3,301,073; 3,543,301; and 3,354,726 are but a few examples of such suspension means.

Having now described spin coupling in detail, the additional apparatus of the present invention and the advantages gained thereby will now be described. As has been pointed out herein, twice spin frequency angular vibration results in both a constant torque and a twice spin speed torque (e.g., with respect to a case fixed reference system) on the rotor, while the principles of spin coupling allow the elimination (minimization) of either but not both of these torques at the same time. However, since in the first embodiment of sensor hereinbefore described the rotor is made pendulous so that useful information is provided by both the rotor deflection and the twice spin speed vibration of the rotor, control of both torques on the rotor from twice spin speed angular vibration is desired. Also, since the rotor is pendulous, twice spin speed linear vibration results in a twice spin speed torque on the rotor, with this torque being controllable by the principles of spin coupling (e.g., the combination of an effective shaft radial unbalance and rotor suspension system angularity) at the expense of generation of a constant torque on the rotor, though both torques should be controlled for best performance of the preferred embodiment sensor. It is this purpose to which the present invention is directed.

The preferred form of sensor for use in the preferred embodiment of the present invention is basically that illustrated schematically in FIG. 4 (and the associated structure illustrated with respect to FIG. 5), though with certain additional structure as shall subsequently be described. Further, the twice spin speed angular vibration sensitivities are adjusted in accordance with the foregoing equations to minimize the twice spin speed torque on the rotor. Having done this, the present invention is directed toward; (1) the reduction of the constant torque on the rotor due to twice spin speed angular vibrations; (2) the further reduction of the twice spin speed torque on the rotor from twice spin speed angular vibration beyond that which may be readily achieved through mechanical adjustments using spin coupling techniques; and (3) the reduction of the twice spin speed torques on the rotor due to twice spin speed linear vibration.

Figure 10:
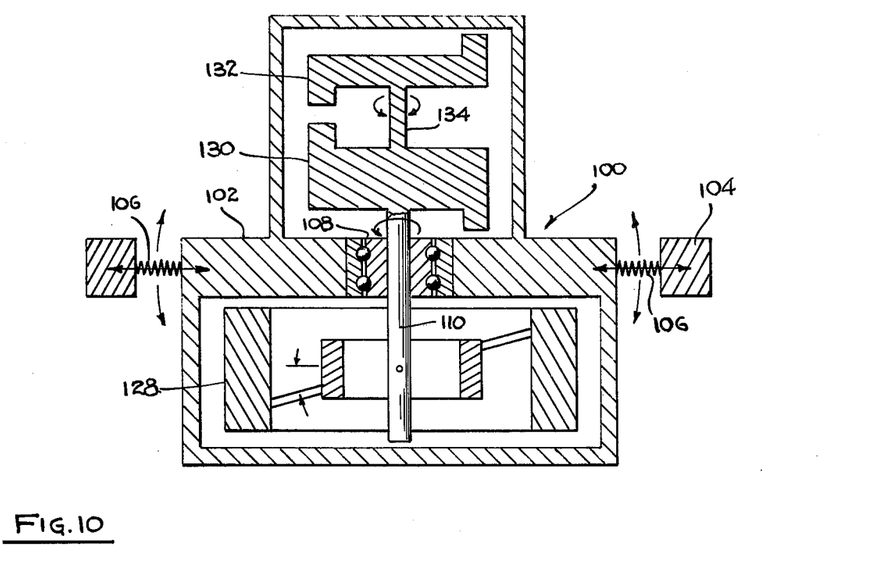
FIG. 10 is a cross-sectional representation of one embodiment of the present invention.

One embodiment for achieving the desired result is shown in FIG. 10. In this embodiment, the instrument 100 is preferably that previously explained with respect to FIG. 4, with the instrument case 102 coupled to the mounting bracket 104 through a mechanical structure providing an effective spring support through the springs 106 (schematically shown in FIG. 10). The springs 106 are proportioned in conjunction with the mass and inertia of the non-rotating portion of the instrument 100 so that the natural frequency of the non-rotating portion of the instrument along any axis perpendicular to the spin axis is equal to twice spin speed, and further, so that the natural frequency about any axis perpendicular to the spin axis is also equal to twice spin speed, e.g., both the linear and the angular vibration natural frequencies of the non-rotating portion of the instrument are equal to twice spin speed.

The effect of the foregoing is as follows. Spin bearing noise (caused by the bearings 108) at twice spin frequency causes a forcing disturbance at twice spin frequency between the rotating assembly and the non-rotating assembly. However, since the non-rotating assembly is tuned to this frequency, the apparent mechanical impedance of the non-rotating assembly is very low, resulting in twice spin speed linear and/or angular vibration of the non-rotating portion of the instrument in response to the bearing noise, rather than forcing an error causing vibration of the rotating system. Since a fairly high Q mounting system to provide the springs 106 may readily be fabricated and accurately tuned, and since the shaft-fixed masses and inertias are on the same order of magnitude as those of a case in a conventional design, reductions of twice spin speed linear and angular vibration on the shaft 110 caused by spin bearing noise at twice spin frequency may generally exceed an order of magnitude using this type of tuned mount.

For purposes of decoupling the various vibratory motions at twice spin speed, it is preferable to have the center of mass of the shaft be mid-point between the two bearings, and coincide with the center of mass of the non-rotating portion of the case and the center of the mounting spring suspension, though this is not a necessity if design constraints prevent it.

The foregoing approach is particularly useful in strap-down systems, as the ultimate mounting surface is normally very rigid and stable. In this regard, any compliance in the vehicle mount normally will be relatively constant from vehicle to vehicle, so that allowance for such compliance may be made when tuning the instrument mount to the twice spin speed frequencies if desired. Also, in most installations the location of the instrument on the vehicle will not be adjacent other sources of twice spin speed vibration. However even in situations where there are some components of twice spin speed vibration on the vehicle or the tuned mounting of the embodiment of FIG. 10 they will not unduly couple those vibrations to the rotating system. In particular, while the case alone is tuned to the twice spin speed frequencies, the case including the rotating system as mounted on the spring suspension 106 is not. Since the bearing compliance is relatively low, and the mass and inertias of the rotating system are on the same order of magnitude as those of the case, the apparent mass and inertia of the assembly mounted on the spring suspension sytem 106 is considerably higher than the case alone, resulting in linear and angular resonant frequencies of the entire assembly on the spring suspension which are substantially less than twice spin frequency (while external vibrations at these frequencies will result in substantial vibration of the entire instrument, the instrument is not fundamentally sensitive to these frequencies, so that the only errors which are induced by such vibration are relatively low second order effects).

Figure 12:
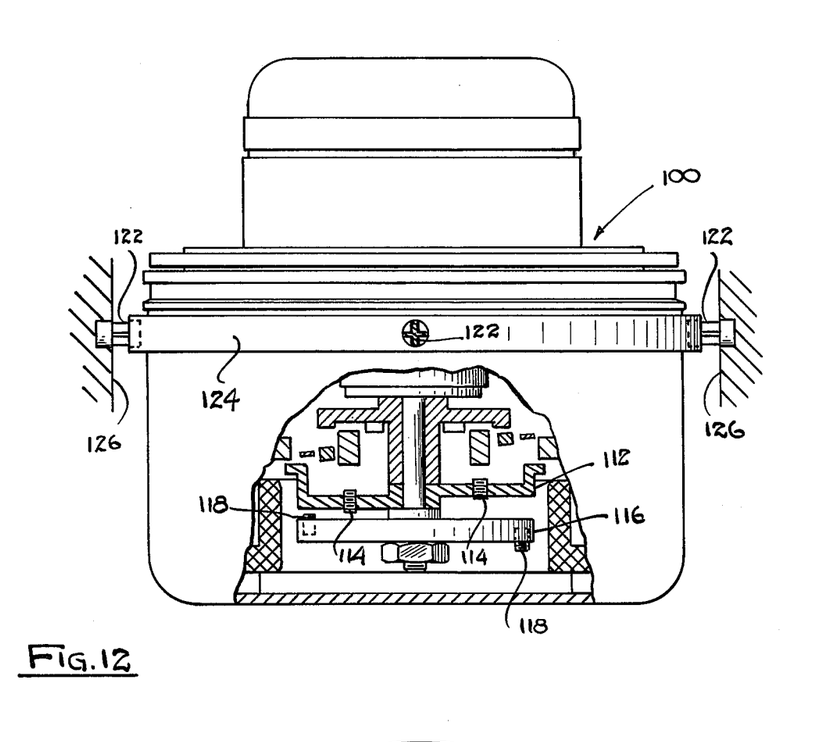
FIG. 12 is a partial cross-section illustrating one form of structure for the embodiment of FIG. 10.

Now referring to FIG. 12, a side view, partially cut away, of an instrument and its mounting in accordance with the schematic representation of FIG. 10 may be seen. The instrument 100 may be generally in accordance with the design of FIG. 5, with the exception that the member illustrated in FIG. 6 as providing the radial unbalance, the product of inertia and the balancing weights and inertia, is replaced by a simple inertia wheel shown in FIG. 15. Also in this embodiment the product of inertia itself is provided by an unsymmetrical rotor stop 112, adjustable by screws 114 (see FIGS. 12 and 15). The inertia wheel 116 is provided with weights 118 to provide an equal and opposite cross product of inertia to dynamically balance the rotating system, with the outer rim of the inertia wheel 116 being supported from a central hub 118 by a plurality of generally flat, radially disposed spokes 120 to provide an angular spring rate of the inertia ring about the hub. By adjusting the ratio of the spring rate and inertia, the inertia wheel 116 may be tuned to spin speed to absorb spin speed shaft vibrations as hereinbefore described with respect to spin coupling.

Figure 13:
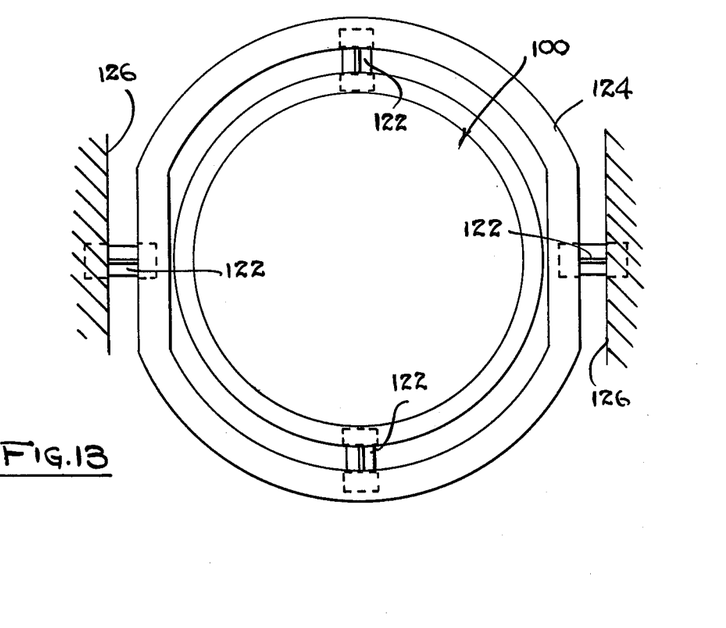
FIG. 13 is a top view of the structure of FIG. 12.
Figures 14, 15, 16:
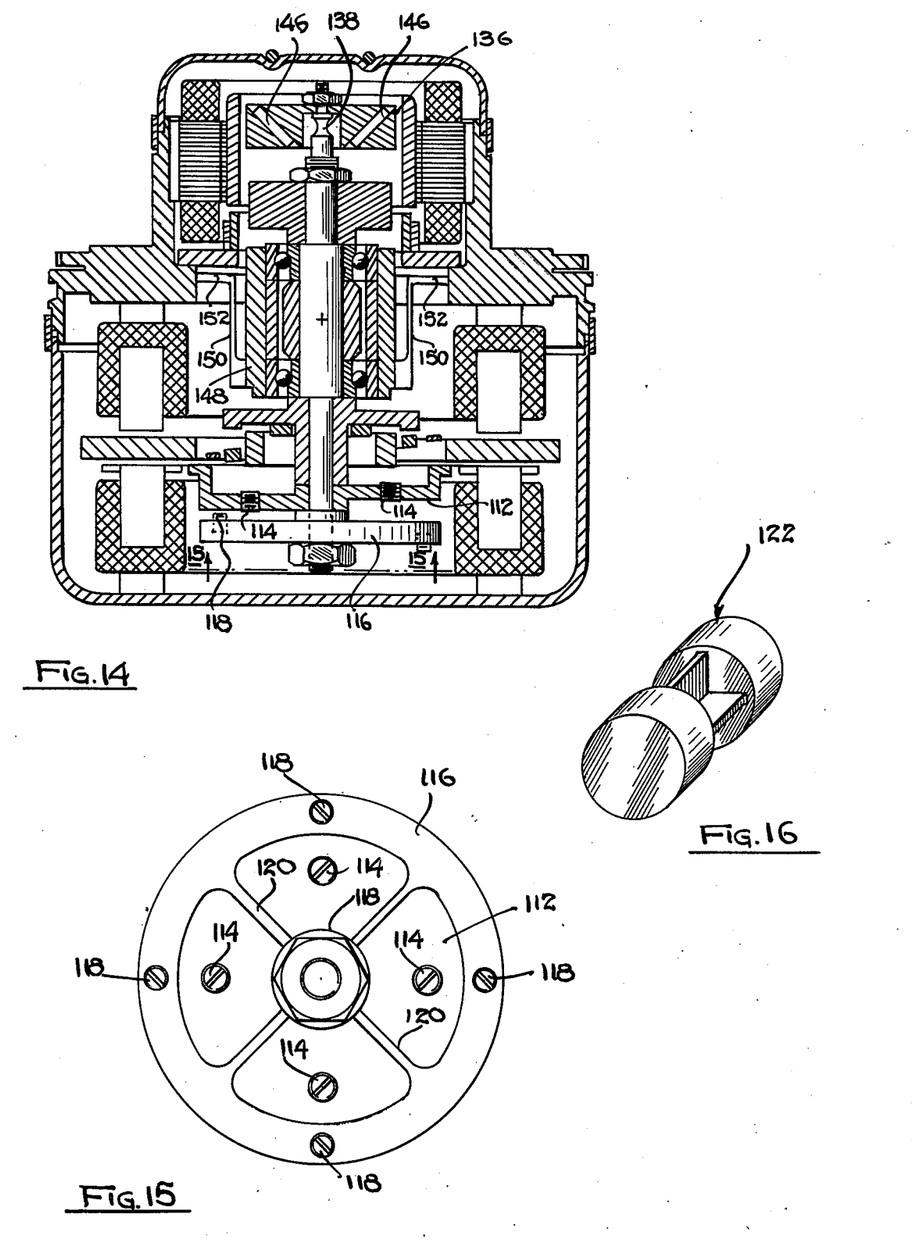
FIG. 14 is a partial cross-section illustrating one form of structure for the embodiment of FIG. 11.
FIG. 15 is an end view taken on an expanded scale of the balancing inertia wheel of FIG. 14.
FIG. 16 is a perspective view taken on an expanded scale of a cruciform torsion spring restraint for the mounting system of FIG. 10.

The instrument itself is mounted on four torsion bar suspension elements 122 visible in FIGS. 12 and 13, and shown individually in perspective on an expanded scale in FIG. 16. These torsion spring suspension elements have a cruciform central cross section to provide the desired torsional spring rates, and relatively stiff linear spring rates depending upon the cruciform dimensions. As shown in FIG. 13, two of the torsion spring elements 122 are disposed between the case of instrument 100 and a mounting gimbal ring 124 along one axis, with the gimbal ring 124 in turn being mounted to the outer instrument mount 126 (shown only schematically in FIGS. 12 and 13). The desired translational spring rates are provided by the combined compliances of the torsion spring elements 122 and the mounting gimbal ring 124, the later of which contributes a significant compliance to the combination. As an alternative, other mounts may be readily designed to provide the desired spring rates by deflection within the support structure, such as in the gimbal ring 124, without separate and/or individually identifiable torsional elements, to provide a one-piece mount for bolting to a vehicle at two or more mounting points.

Figure 11:
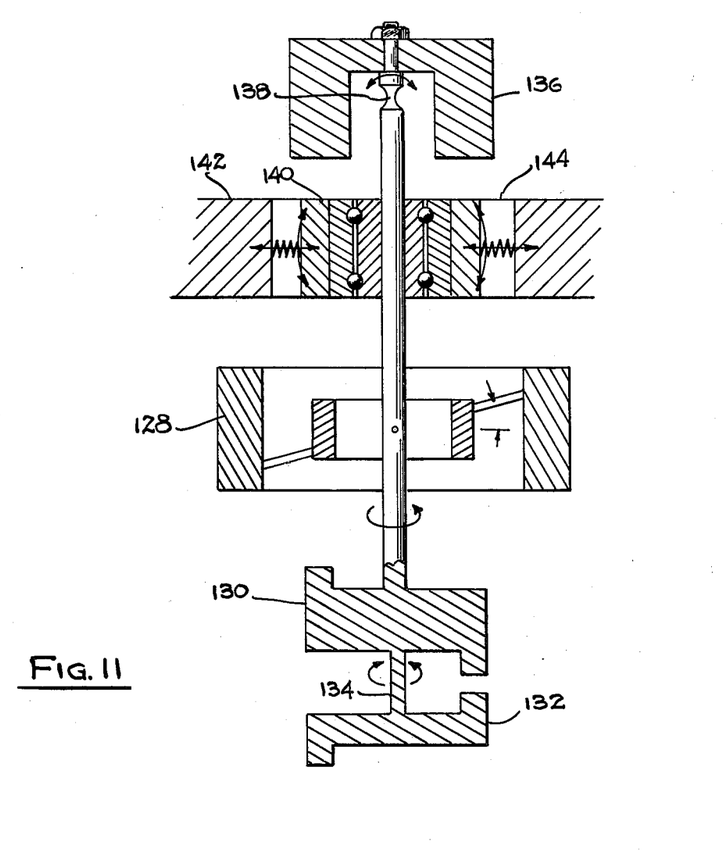
FIG. 11 is a cross-sectional representation of an alternate embodiment of the present invention.

Now referring to FIG. 11, a schematic diagram of an alternate embodiment of the present invention may be seen. The rotating assembly of this instrument includes a rotor assembly 128, a product of inertia 130 rigidly coupled to the rotating assembly, and a counterbalancing product of inertia 132 mounted to the rotating assembly through a torsional spring 134 and tuned to the spin speed, as in the configuration of FIG. 10. In addition, the rotating assembly includes an inertia 136 coupled to the relatively rigid shaft by a region of reduced diameter 138. The region of reduced diameter 138 provides a predetermined torsional spring rate along any axis perpendicular to the spin axis, thereby allowing the axis of the inertia 136 to deviate from coaxial alignment with the axis of the remaining rotating assembly with a specified spring rate.

Since the spring 138 as well as the inertia 136 are symmetrical, the spring rate of spring 138 and the inertia of inertia 136 about any axis perpendicular to the shaft spin axis and through the center of support provided by the spring 138 are equal. If, in addition the ratio of the spring rate of spring 138 and the inertias of the inertia wheel 136 are appropriately selected, the inertia wheel will act as a twice spring frequency (case fixed reference system) angular vibration absorber. For this purpose the absorber is tuned so that the following equation is met:

$$K = 2n^2(2A_2 - C_2)$$

where:
 $K$; angular spring rate of element 138 about an axis perpendicular to the spin axis
 $n$; is the spin frequency
 $A_2$; is the amount of inertia of the vibration absorber wheel about an axis perpendicular its polar axis
 $C_2$; is the polar moment of inertia of the vibration absorber wheel When so tuned, a twice spin speed angular vibration torque on the shaft perpendicular to the spin axis caused by the spin bearings will result in a vibration of the absorber wheel 136, so that the spring 138 will create an equal and opposite torque on the shaft, thereby minimizing the motion of the shaft in response to the basic spin bearing vibratory input. To enhance the performance of the system, however, it is preferred to effectively soft mount the spin bearings 140 with respect to the instrument case 142, the soft mounting being shown schematically by element 144. More particularly, the soft mounting to minimize the twice spin frequency angular vibration force on the shaft should be soft (e.g., compliant, or having reduced restraint) with respect to twice spin speed vibrations so as to allow the outer race (in the schematic representation of FIG. 11) of the spin bearings to vibrate at twice spin speed, rather than having the outer race retained so that the bearing noise is much more directly communicated to the inner race and shaft assembly. Furthermore, in this embodiment it is preferable for the bearing mounting 144 to also be relatively soft in a radial direction with respect to twice spin speed linear vibration, since as previously mentioned, the twice spin speed linear vibration sensitivity caused by the mass unbalance of the rotor (for acceleration sensing) is not eliminated in the preferred embodiment by the concepts of spin coupling. Since the soft mounting of the outer race of the spin bearing may be accomplished substantially at the spin bearings, there is little associated inertia for the bearing noise to drive. Thus, in summary, one may approach an order of magnitude improvement (decrease) in the instrument drift due to twice spin speed linear vibrational input from bearing noise, and may also approach an order of magnitude improvement in twice spin speed angular vibrational input from bearing noise beyond that attainable by spin coupling alone by the combination of the vibration absorber and the soft mounting of the bearings.

Now referring to FIG. 14, a partial cross section of a representative instrument utilizing the concepts of the embodiment of FIG. 10 may be seen. In this embodiment the lower portion of the rotor assembly is substantially the same as that shown in the cut-away portion of FIG. 12, and accordingly the various parts shown therein are similarly numbered (see also FIG. 5 and the description relating thereto for further details on the pick-offs, torquers, etc.). The vibration absorber wheel 136 and spring 138 may be seen at the upper end of the rotor assembly, with adjustment screws such as screws 146 providing an adjustment in the tuning and balance of the vibration absorber. The bearing assembly comprises a tubular member 148 receiving the outer races of the two spin bearings and a spacer therebetween, with the member 148 being supported from the instrument case by a plurality of leg-like members having an axially oriented section 150 and a radially directed segment 152. With this arrangement, both translational and angular compliance is provided, so that the majority of the spin bearing noise results in vibration of the outer race assembly rather than the inner race assembly. A metallic support for the outer race assembly is preferred, so as to better and more repeatably define the true spin axis position.

In the embodiments of the present invention disclosed herein, the principles of spin coupling are utilized in a two-axis angular rate and acceleration sensor to reduce the rate sensing signal sensitivity to twice spin speed angular vibration, utilizing either instrument mounting, or spin bearing mounting together with an additional vibration absorber on the rotating system, to further reduce the twice spin frequency angular vibration sensitivity, and to also reduce the rate signal sensitivity to twice spin speed linear vibration. In the embodiment utilizing the tuned mounting system, a composite structure has been disclosed, though structures having selected distributed compliance may also be utilized to achieve the same purpose. Similarly, with respect to the embodiment utilizing a relatively soft spin bearing mount in the instrument case, other techniques for achieving the soft mount may be utilized. (The phrases soft mounting, compliant mounting and reduced restraint of the bearings being relative terms with respect to the equivalent spring rate of the bearings themselves, preferably the compliant mounting having a stiffness on the order of one-tenth of the spin bearings or less, though not necessarily limited to this precise range.) In essence, the two approaches are similar, the tuned mounting effectively minimizing the bearing restraint by minimizing the apparent inertia of the nonrotating portion of the instrument, whereas the soft mounting of the bearings actually minimizes the apparent inertia and rigidity of the "instrument case" as seen by the bearings, with a further vibration absorber on the shaft effectively enhancing the apparent inertia of the rotating portion of the instrument. Obviously other designs for reducing the vibrational sensitivity of instruments of this type will now be obvious. By way of specific example, outer race preloading, rather than the inner race preloading normally used, will result in the reversal of the contact angle of the ball bearings which, utilizing a relatively small bearing spacing, will give rise to a relatively compliant spin bearing assembly with respect to rotation about an axis perpendicular to the spin axis, which compliance itself may be sufficient for a particular design to achieve one of the compliances described with respect to FIGS. 10 and 14. (Obviously this technique is generally limited to ball bearings, though the other embodiments shown and described herein are equally applicable to other types of spin bearing structures.) Similarly the concepts of the present invention may be utilized with sensors of other designs, though the concepts are particular suited to sensors providing useful information as a result of both case fixed torques and twice spin speed torques on the sensing element. Thus while preferred embodiments of the present invention have been disclosed and described in detail herein, it will be obvious to those of reasonable skill in the art that various changes in form and detail may be made therein without departing from the spirit and scope of the invention.

I claim:

1. A tuned inertial instrument comprising:
   an instrument case;
   a shaft means supported on bearings coupled to said instrument case for rotation about a spin axis at a predetermined spin frequency within said instrument case;
   a sensitive element;
   a suspension means for coupling said sensitive element to said shaft, said suspension means including means for allowing relative oscillation between said sensitive element and said shaft about at least one suspension means axis, said suspension means axis being non-orthogonally disposed with respect to said spin axis by a predetermined angle;
   means coupled to said shaft for providing a product of inertia about said spin axis and an axis perpendicular to said spin axis; and
   means for reducing the apparent angular restraint of the nonrotating portion of said bearings about axes generally perpendicular to said spin axis.

2. The instrument of claim 1 wherein said means for reducing the apparent angular restraint of the nonrotating portion of said bearings comprises spring means for mounting said instrument case with predetermined angular spring rates about axes perpendicular to said spin axis.

3. The instrument of claim 2 wherein the angular spring rate of said spring means for mounting said instrument case and the inertias of said instrument case are selected to provide a natural frequency of said instrument case about axes perpendicular to said spin axis substantially equal to twice spin frequency.

4. The instrument of claim 3 wherein the center of mass of said instrument case and the center of mass of the rotating assembly within said instrument case are substantially on the axis of rotation of said spring means for mounting said instrument case.

5. The instrument of claim 1 further comprised of means for mounting said instrument case with a predetermined linear spring rate along axes perpendicular to said spin axis, said predetermined linear spring rate and the mass of said instrument case being selected to provide a translational natural frequency along axes perpenciular to said spin axis substantially equal to twice spin frequency.

6. The instrument of claim 5 wherein the center of mass of said instrument case and the center of mass of the rotating assembly within said instrument case are substantially on the center of support of said means for mounting said instrument.

7. The instrument of claim 1 wherein said means for reducing the apparent angular restraint of the nonrotating portion of said bearings comprises means for coupling said nonrotating portion of said bearings to said instrument case, said last named means having substantial compliance in rotation about axes perpendicular to said spin axis.

8. The instrument of claim 7 wherein said last named means further has substantial compliance in translation along axes perpendicular to said spin axis.

9. The instrument of claim 7 further comprised of an inertia, and an inertia coupling means for spring coupling said inertia to said shaft means to allow spring restrained deviation of the axis of rotation of said inertia from said spin axis.

10. The instrument of claim 9 wherein the moments of inertia of said inertia and the spring rate of said inertia coupling means are selected to tune said inertia to substantially twice spin frequency when said shaft means is rotating at spin frequency.

11. A tuned inertial instrument comprising:
    an instrument case;
    a shaft means supported on bearings coupled to said instrument case for rotation about a spin axis at a predetermined spin frequency within said instrument case;
    a sensitive element having at least one sensitive element principal axis fixed with respect to said sensitive element;
    a suspension means for coupling said sensitive element to said shaft, said suspension means including means for allowing relative oscillation between said sensitive element and said shaft about at least one suspension means axis, said suspension means axis being nonorthogonally disposed with respect to said sensitive element principal axis by a predetermined angle;
    means coupled to said shaft for providing a product of inertia about said spin axis and an axis perpendicular to said spin axis; and
    means for reducing the apparent angular restraint of the nonrotating portion of said bearings about axes generally perpendicular to said spin axis.

12. The instrument of claim 11 wherein said means for reducing the apparent angular restraint of the nonrotating portion of said bearings comprises spring means for mounting said instrument case with predetermined angular spring rates about axes perpendicular to said spin axis.

13. The instrument of claim 12 wherein the angular spring rate of said spring means for mounting said instrument case and the inertias of said instrument case are selected to provide a natural frequency of said instrument case about axes perpendicular to said spin axis substantially equal to twice spin frequency.

14. The instrument of claim 13 wherein the center of mass of said instrument case and the center of mass of the rotating assembly within said instrument case are substantially on the axis of rotation of said spring means for mounting said instrument case.

15. The instrument of claim 11 further comprised of means for mounting said instrument case with a predetermined linear spring rate along axes perpendicular to said spin axis, said predetermined linear spring rate and the mass of said instrument case being selected to provide a translational natural frequency along axes perpendicular to said spin axis, substantially equal to twice spin frequency.

16. The instrument of claim 15 wherein the center of mass of said instrument case and the center of mass of the rotating assembly within said instrument case are substantially on the center of support of said means for mounting said instrument.

17. The instrument of claim 11 wherein said means for reducing the apparent angular restraint of the nonrotating portion of said bearings comprises means for coupling said nonrotating portion of said bearings to said instrument case, said last named means having substantial compliance in rotation about axes perpendicular to said spin axis.

18. The instrument of claim 17 wherein said last named means further has substantial compliance in translation along axes perpendicular to said spin axis.

19. The instrument of claim 17 further comprised of an inertia, and an inertia coupling means for spring coupling said inertia to said shaft means to allow spring restrained deviation of the axis of rotation of said inertia from said spin axis.

20. The instrument of claim 19 wherein the moments of inertia of said inertia and the spring rate of said inertia coupling means are selected to tune said inertia to substantially twice spin frequency when said shaft means is rotating at spin frequency.

21. An inertial instrument comprising:
a shaft means for rotation about a spin axis at a predetermined spin frequency;
a rotor having first, second and third orthogonal principal axes, said third principal axis being approximately aligned with said spin axis, said rotor having substantially different moments of inertia about said first and second principal axes;
a suspension means for coupling said rotor to said shaft, said suspension means having first and second torsional spring rates about first and second suspension means axes respectively, said suspension means axes being non-orthogonally disposed with respect to said spin axis by a predetermined angle, said rotor having a predetermined pendulosity along said first principal axis with respect to the center of support of said suspension means;
inertia means fastened to said shaft for providing a product of inertia about said spin axis and an axis perpendicular to said spin axis; and
means for reducing the apparent angular restraint of the nonrotating portion of said bearings about axes generally perpendicular to said spin axis.

22. The instrument of claim 21 further comprised of means for dynamically balancing the rotating assembly, said means for dynamically balancing the rotating assembly comprising a balancing inertia means having a product of inertia selected to make the net product of inertia of the rotating assembly substantially equal to zero, said means for dynamically balancing the rotating assembly being coupled to said shaft means through a torsional spring having a torsion axis substantially parallel with said spin axis so as to provide a resonant frequency with respect to said shaft means about said torsion axis substantially equal to the spin frequency.

23. The instrument of claim 22 wherein said means for reducing the apparent angular restraint of the nonrotating portion of said bearings comprises spring means for mounting said instrument case with predetermined angular spring rates about axes perpendicular to said spin axis.

24. The instrument of claim 23 wherein the angular spring rate of said spring means for mounting said instrument case and the inertias of said instrument case are selected to provide a natural frequency of said instrument case about axes perpendicular to said spin axis substantially equal to twice spin frequency.

25. The instrument of claim 24 wherein the center of mass of said instrument case and the center of mass of the rotating assembly within said instrument case are substantially on the axis of rotation of said spring means for mounting said instrument case.

26. The instrument of claim 24 further comprised of means for mounting said instrument case with a predetermined linear spring rate along axes perpendicular to said spin axis, said predetermined linear spring rate and the mass of said instrument case being selected to provide a translational natural frequency along axes perpendicular to said spin axis substantially equal to twice spin frequency.

27. The instrument of claim 26 wherein the center of mass of said instrument case and the center of mass of the rotating assembly within said instrument case are substantially on the center of support of said means for mounting said instrument.

28. The instrument of claim 27 wherein said instrument is adjusted so that the following equations are effectively satisfied:

$$\frac{K_1+K_2}{2} = N^2\left[2(A+B-C) + \frac{1}{2}(A_1+B_1-C_1) + \frac{C(C_1+C_s)\tan^2\alpha}{2(C+C_1+C_s)}\right]$$

$$\frac{N^2}{2}\left[A_1+B_1-C_1 - \frac{C(C_1+C_s)\tan^2\alpha}{C+C_1+C_s}\right] + \frac{K_2-K_1}{2} = 0$$

$$\frac{D_s C \tan\alpha}{C+C_1+C_s} = A + B - C + \frac{A_1+B_1-C_1}{2}$$

where $A$, $B$, and $C$ are the moments of inertia of said rotor about said first, second and third principal axes, $A_1$, $B_1$ and $C_1$ are the moments of inertia of a gimbal, if any, providing said first and second spring rate about axes substantially parallel to said first, second and third principal axes of said rotor, respectively, $N$ is the spin frequency, $K_1$ and $K_2$ are said first and second torsional spring rates respectively, $C_s$ is the moment of inertia of said shaft about said spin axis, $D_s$ is the magnitude product of said product of inertia of said inertia means and $\alpha$ is said predetermined angle.

29. The instrument of claim 28 wherein said last named means further has substantial compliance in translation along axes perpendicular to said spin axis.

30. The instrument of claim 29 wherein the moments of inertia of said inertia and the spring rate of said inertia coupling means are selected to tune said inertia to substantially twice spin frequency when said shaft means is rotating at spin frequency.

31. The instrument of claim 30 wherein said instrument is adjusted so that the following equations are effectively satisfied:

$$\frac{K_1+K_2}{2} = N^2\left[2(A+B-C) + \frac{1}{2}(A_1+B_1-C_1) + \frac{C(C_1+C_s)\tan^2\alpha}{2(C+C_1+C_s)}\right]$$

-continued $$\frac{N^2}{2}\left[A_1+B_1-C_1-\frac{C(C_1+C_s)\tan^2\alpha}{C+C_1+C_s}\right]+\frac{K_2-K_1}{2}=0$$

$$\frac{D_sC\tan\alpha}{C+C_1+C_s}=A+B-C+\frac{A_1+B_1-C_1}{2}$$

where $A$, $B$, and $C$ are the moments of inertia of said rotor about said first, second and third principal axes, $A_1$, i $B_1$ and $C_1$ are the moments of inertia of a gimbal, if any, providing said first and second spring rate about axes substantially parallel to said first, second and third principal axes of said rotor, respectively, $N$ is the spin frequency, $K_1$ and $K_2$ are said first and second torsional spring rates respectively, $C_s$ is the moment of inertia of said shaft about said spin axis, $D_s$ is the magnitude product of said product of inertia of said inertia means and $\alpha$ is said predetermined angle.

32. The instrument of claim 28 further comprised of an inertia, and an inertia coupling means for spring coupling said inertia to said shaft means to allow spring restrained deviation of the axis of rotation of said inertia from said spin axis.

33. The instrument of claim 22 wherein said means for reducing the apparent angular restraint of the nonrotating portion of said bearings comprises means for coupling said nonrotating portion of said bearings to said instrument case, said last named means having substantial compliance in rotation about axes perpendicular to said spin axis.

* * * * *